United States Patent [19]

Kwon

[11] Patent Number: 5,280,393
[45] Date of Patent: Jan. 18, 1994

[54] CIRCUIT FOR MONITORING THE RECORDED STATE OF AUDIO SIGNAL

[75] Inventor: O Sang Kwon, Kangwon, Rep. of Korea

[73] Assignee: Gold Star Co., Ltd., Rep. of Korea

[21] Appl. No.: 777,086

[22] Filed: Oct. 16, 1991

[51] Int. Cl.⁵ .......................... G11B 5/02; G11B 27/36
[52] U.S. Cl. ...................................................... 360/25
[58] Field of Search ...... 360/25, 31, 67, 63-64, 46, 61; 369/1-2, 55; 381/120-123, 56

[56] References Cited

U.S. PATENT DOCUMENTS

| 3,879,751 | 4/1975 | Gimelli | 360/31 |
| 4,245,136 | 1/1981 | Krauel, Jr. | 381/56 |
| 4,412,258 | 10/1983 | Shimada | 360/31 |

OTHER PUBLICATIONS

*Microelectronic Circuits* by Adel S. Sedra and Kenneth C. Smith, ©1987 CBS Publishing New York, N.Y., p. 8.

*Primary Examiner*—Andrew L. Sniezek
*Assistant Examiner*—Jennifer Pearson
*Attorney, Agent, or Firm*—Poms, Smith, Lande & Rose

[57] ABSTRACT

A circuit for monitoring the recorded state of audio signals from a microphone on a magnetic tape. The circuit comprises an additional head having only a playback function. The head functions to detect an audio signal recorded on the magnetic tape. The detected audio signal is then applied to an outer speaker, via a switch. Accordingly, the user can monitor completely the recorded state of the audio signal on the magnetic tape in the record mode operation of audio device.

6 Claims, 2 Drawing Sheets

CIRCUIT FOR MONITORING THE RECORDED STATE OF AUDIO SIGNAL

BACKGROUND OF THE INVENTION

1. Field of the Invention

The present invention relates to an audio device, and more particularly to a circuit for monitoring the recording state of audio signals in a magnetic tape.

2. Description of the Prior Art

As a widely used method for recording audio signals on a certain medium and for playing back the recorded signals, there is a method in which electric audio signals are stored in a magnetic tape as magnetic signals by using an audio head, and if necessary, the magnetic signals are converted into electric audio signals by the audio head again.

Referring to FIG. 1, there is shown a circuit diagram of a conventional audio device in an audio head and a magnetic tape are utilized for recording audio signals on the magnetic tape and playing back the recorded audio signals. The audio device comprises an audio signal record and detect circuit 100, a first amplifying circuit 200, a second amplifying circuit 300, and a third amplifying circuit 400.

The audio signal record and detect circuit 100 which is adapted to selectively record audio signals on a magnetic tape or detect them. That is, the audio signal record and detect circuit 100 includes a mixer 10 to which the output from the third amplifying circuit 400 is applied. The mixer 10 comprises an oscillator 11 for oscillating a bias signal and an adder 12 for mixing the output from the third amplifying circuit 400 and the output from the oscillator 11. The audio signal record and detect circuit 100 also includes a switch SW2 to which the mixer 10 is connected so that its output is selectively applied to an audio head AHD, according to the switching operation of the switch SW2. The circuit 100 also comprises an audio head AHD for detecting signals recorded on the magnetic tape.

The first amplifying circuit 200 comprises a switch SW1 for selectively connecting the output of the audio signal record and detect circuit 100 and the first amplifying circuit 200 and an OP amplifier OP1 for amplifying the output sent from the circuit 100 via the switch SW1.

The third amplifying circuit 400 comprises a switch SW3 connected at its fixed terminals P and R with the output of the first amplifying circuit 200 and the output of the second amplifying circuit 300, respectively, and OP amplifiers OP2, OP3 and OP4. In particular, the OP amplifier OP4 is connected at its input and output to the OP amplifier OP2 and the mixer 10, respectively.

All of switches SW1 to SW3 are operatively connected with one another, as shown in FIG. 1.

This device having the above-mentioned arrangement is operated in a record mode for recording audio signals received from a microphone MIC on a magnetic tape or in a playback mode for playing back the audio signals recorded on the magnetic tape, for their listening. Now, the operation of the device will be described in conjunction with respective modes.

1) RECORD MODE

When the audio device should be operated in its record mode, the user operates switches SW1, SW2 and SW3 operatively connected with one another so that their movable terminals are connected to the corresponding fixed terminals R, respectively. Accordingly, an audio signal from the microphone MIC is sent to the second amplifying circuit 300 and amplified by the second amplifying circuit 300. The amplified audio signal is then applied to the third amplifying circuit 400, via the switch SW3. The audio signal applied to the third amplifying circuit 400 is amplified in the OP amplifier OP2 which is a linear amplifier and then applied to OP amplifiers OP3 and OP4.

The OP amplifier OP3 is a monitor amplifier which functions to amplify the audio signal to the level suitable for driving an outer earphone EP or a speaker SPK. On the other hand, the OP amplifier OP4 amplifies the audio signal to the level suitable for recording it on the magnetic tape by an audio head and applies the amplified audio signal to the mixer 10. The adder 12 of mixer 10 mixes the output from the oscillator 11 generating a bias signal with a certain frequency and the output from the OP amplifier OP4. As a result, the audio signal from the microphone can be stored in the magnetic tape by the audio head AHD and via the switch SW2 of the audio signal record and detect circuit 100.

Since the audio signal from the microphone MIC is also sent to the outer earphone, via the OP amplifier OP3, the user can check whether the audio signal received from the microphone MIC is good, by listening to the sound from the earphone.

2) PLAYBACK MODE

When the audio device should be operated in its playback mode, the user operates switches SW1, SW2 and SW3 so that their movable terminals are connected to the corresponding fixed terminals P, respectively. Accordingly, an audio signal by the audio head AHD is sent to the first amplifying circuit 200 via the switch SW1 and amplified by the OP amplifier OP1 of the first amplifying circuit 200. The amplified audio signal is then applied to the third amplifying circuit 400, via the switch SW3. Thereby, the user can listen to the sound played back from the audio signal recorded on the magnetic tape.

During the operation of the audio device in the playback mode, an audio signal possibly sent from the microphone MIC is prevented from being applied to the third amplifying circuit 400, by virtue of the switch SW3. The switch SW2 functions to prevent the output from the mixer 10 to be applied to the audio head AHD.

According to the arrangement of the conventional audio device, the user can monitor whether an audio signal is outputted from the microphone, in that in record mode operation, the third amplifying circuit amplifies the audio signal from the microphone and sends the amplified audio signal to the earphone. However, it is impossible to confirm whether the received audio signal is correctly recorded on the magnetic tape by the audio head. If an abnormality occurs at the mixer or the audio head, the audio signal can not correctly recorded on the magnetic tape. In spite of this, the user continuously attempts to operate the audio device in its record mode for recording the audio signal on the magnetic tape, since he can not recognize the abnormality by monitoring only the audio sound from the earphone. As a result, he can recognize the record of no audio signal, only under the playback mode operation of the audio device.

SUMMARY OF THE INVENTION

Therefore, it is an object of the invention to provide an audio device including an additional head having only a playback function, thereby capable of correctly monitoring the recorded state of audio signals on a magnetic tape in its record mode operation.

According to the present invention, this object can be accomplished by providing a circuit for monitoring the recorded state of an audio signal from a microphone on a magnetic tape, comprising: audio signal record and detect means for recording the audio signal on the magnetic tape and detecting the audio signal recorded thereon; audio signal detect means for detecting the audio signal recorded the magnetic tape; first amplifying means for amplifying selectively the output from said audio signal record and detect means and the output from said audio signal detect means; second amplifying means for amplifying the audio signal from the microphone; third amplifying means for amplifying selectively the output from said first amplifying means or the output from the second amplifying means and applying the amplified output to the audio signal record detect means, a speaker and an earphone; and fourth amplifying means for amplifying selectively the first amplifying means and applying the amplified output to a second speaker or a second earphone.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 2:
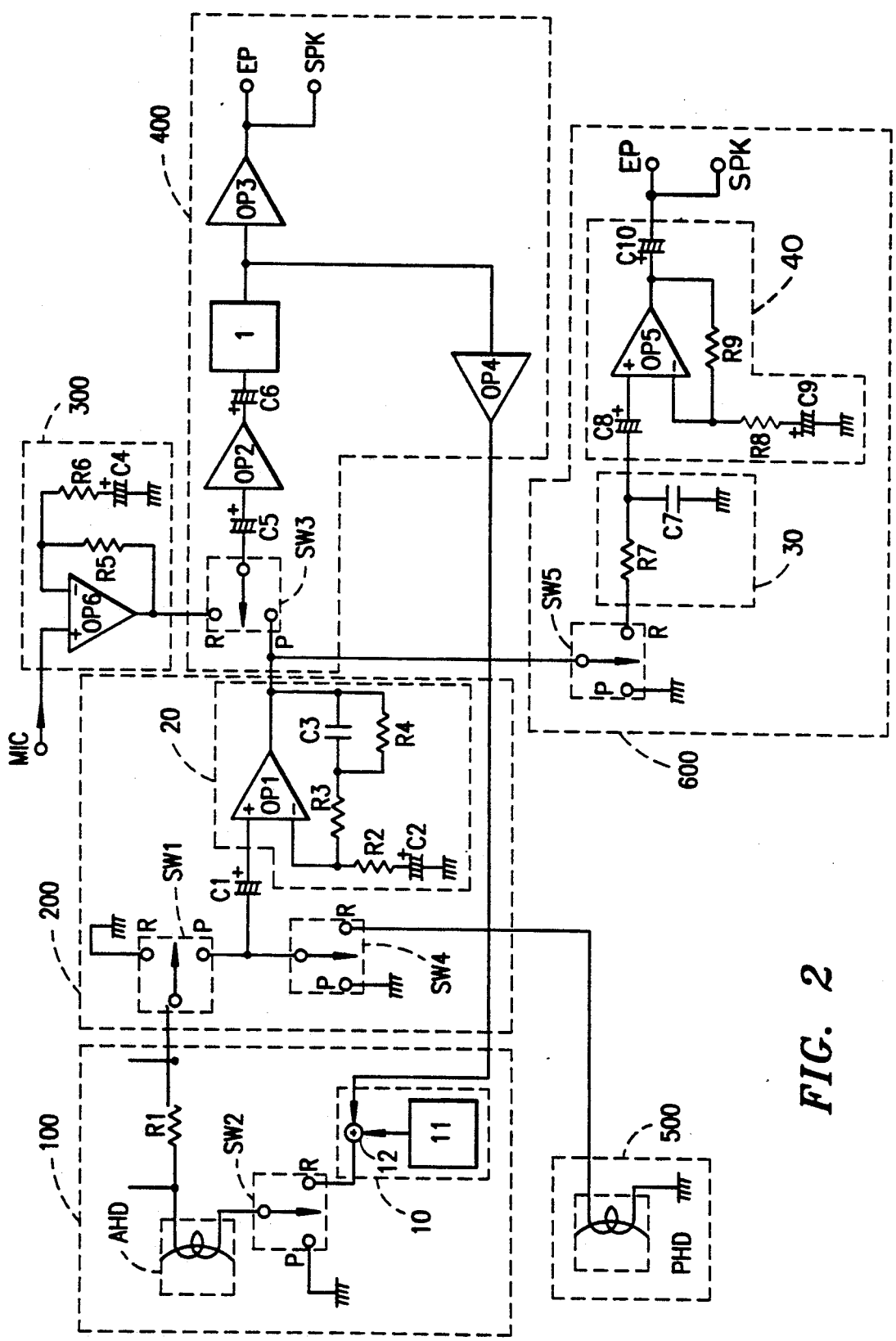
FIG. 2 is a circuit diagram of a device for monitoring the recorded state of audio signals in accordance with the present invention.

Referring to FIG. 2, there is shown a circuit diagram of a device for monitoring the recorded state of audio signals in accordance with the present invention. The device comprises an audio signal record and detect circuit 100, a first amplifying circuit 200, a second amplifying circuit 300, a third amplifying circuit 400, an audio signal detect circuit 500 and a fourth amplifying circuit 600.

Figure 1:
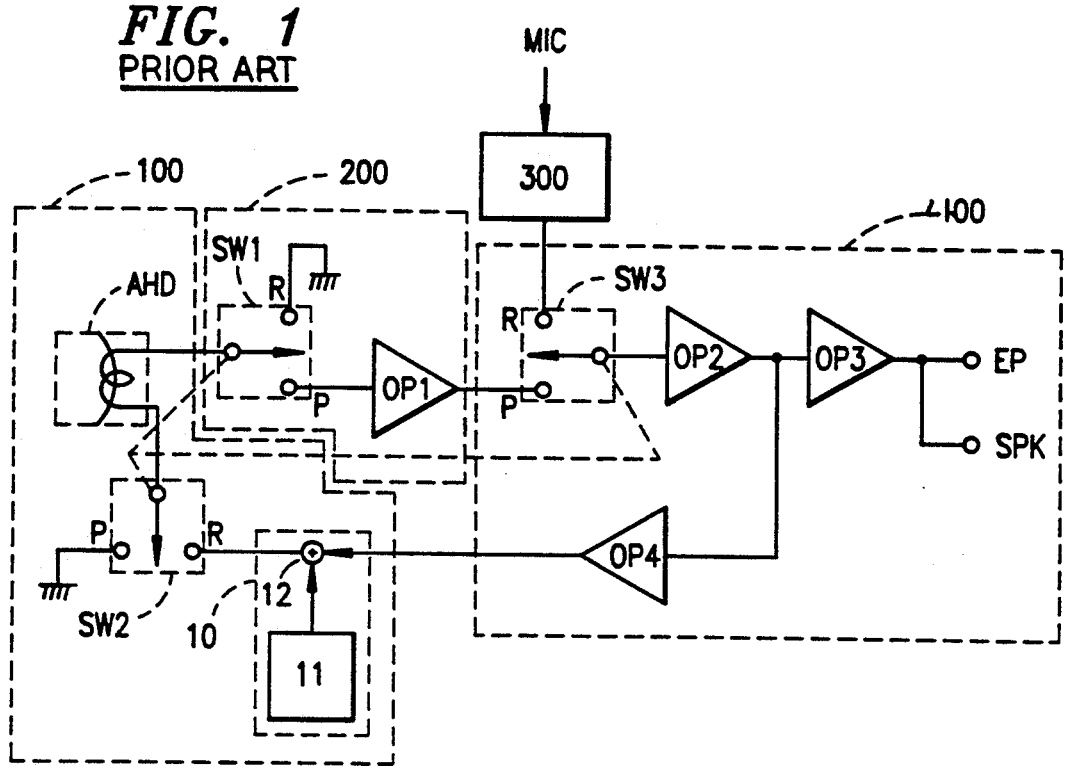
FIG. 1 Prior Art is a circuit diagram of a conventional audio device in accordance with the prior art.
Figure 3:
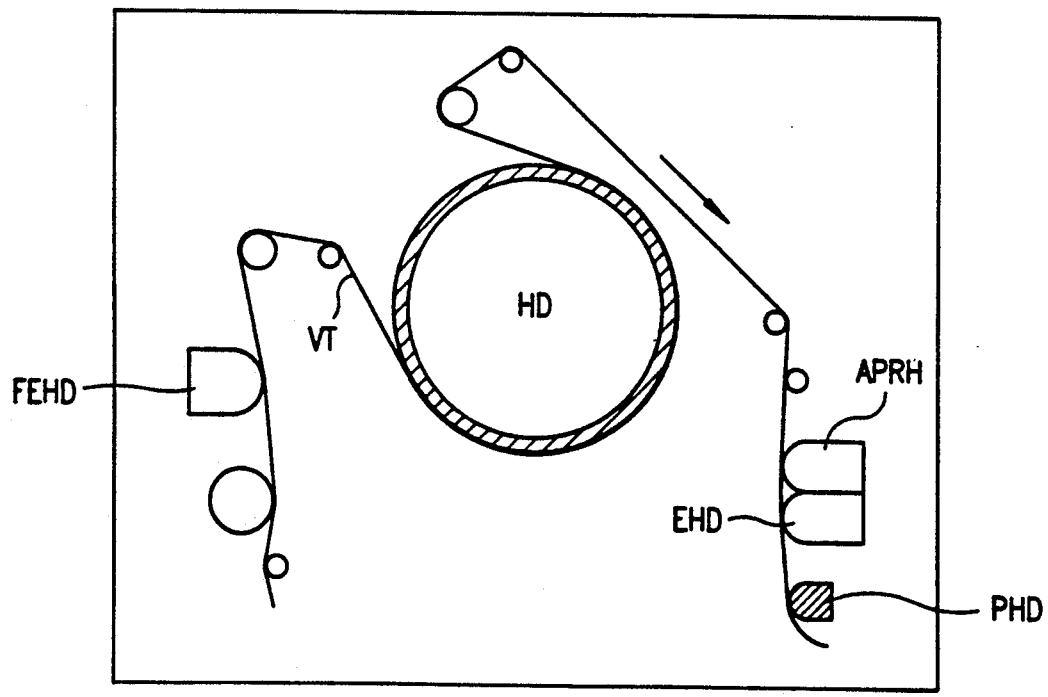
FIG. 3 is a schematic view of heads used in the monitoring circuit of the present invention.

The audio signal record and detect circuit 100 which is adapted to selectively record audio signals on a magnetic tape or detect them has the same arrangement as that of the above-described prior art circuit. That is, the audio signal record and detect circuit 100 includes a mixer 10 to which the output from the third amplifying circuit 400 is applied. The mixer 10 comprises an oscillator 11 for oscillating a bias signal and an adder 12 for mixing the output from the third amplifying circuit 400 and the output from the oscillator 11. The audio signal record and detect circuit 100 also includes a switch SW2 to which the mixer 10 is connected so that its output is selectively applied to an audio head AHD, according to the switching operation of the switch SW2. As shown in FIG. 3, the audio head AHD comprises an audio signal record and detect head APRHD for detecting signals recorded on the magnetic tape and an erase head EHD for erasing signals recorded the magnetic tape.

FIG. 3 illustrates an example of video cassette recorders. In the drawing, HD designates a video drum, FEHD an erase head for erasing image signals recorded on a video tape VT, and the arrow the travel direction of the video tape VT.

On the other hand, the audio signal detect circuit 500 is adapted to detect audio signals recorded on the magnetic tape. As shown in FIG. 3, the audio signal detect circuit 500 comprises an exclusive playback head PHD spaced away from the audio head AHD and adapted to detect only audio signals recorded on the magnetic tape.

The first amplifying circuit 200 is adapted to amplify selectively the output from the audio signal record and detect circuit 100 or the output from the audio signal detect circuit 500. To this end, the first amplifying circuit 200 comprises a amplifying circuit 20 to which the audio signal record and detect circuit 100 and the audio signal detect circuit 500 are selectively connected, by means of switches SW1 and SW4, respectively. The switch SW1 is selectively connected with the switch SW4. The amplifying circuit 20 comprises an OP amplifier OP1, a filtering capacitor C3 connected at both ends thereof to the inverting terminal-of the OP amplifier OP1 via a resistor R3 and the output terminal of the OP amplifier OP1, and a resistor R4 connected at both ends thereof to both ends of the filtering capacitor C3, respectively. To the inverting terminal of the OP amplifier OP1, a capacitor C2 for removing noise is connected via a resistor R2. Between the connection of switches SW1 and SW4 and the terminal + of the OP amplifier OP1, a capacitor C1 for cutting off direct current is connected.

On the other hand, the second amplifying circuit 300 comprises an OP amplifier OP6 connected at its terminal + with a microphone MIC. To the inverting terminal of the OP amplifier OP6, a capacitor C4 for removing noise is connected via a resistor R6. A resistor R5 is connected between the output terminal and the inverting terminal—of the OP amplifier OP6.

The third amplifying circuit 400 is adapted to selectively amplify the output from the first amplifying circuit 200 or the output from the second amplifying circuit 300. To this end, the third amplifying circuit 400 comprises a switch SW3 connected at its fixed terminals P and R with the first amplifying circuit 200 and the second amplifying circuit 300, respectively. To the movable terminal of the switch SW3, a linear amplifier OP2 is connected via a capacitor C5 for cutting off direct current. A remover 1 which is a notch filter or an LC filter is connected to the output of the OP amplifier OP2, via a capacitor C6 for cutting off direct current. To the output of the remover 1, an OP amplifier OP3 is connected which is adapted to amplify the signal from the remover 1 to the level for driving an outer speaker SPK or an earphone EP.

The remover 1 of the third amplifying circuit 400 is connected with a record amplifier OP4 which is connected at its output terminal to the mixer 10.

On the other hand, the fourth amplifying circuit 600 is adapted to selectively amplify the output from the first amplifying circuit 200 and apply the amplified output to the outer speaker or the earphone. The fourth amplifying circuit 600 comprises a switch SW5 connected at its movable terminal to the output of the first amplifying circuit 200, a filter 30 connected to the fixed terminal R of the switch SW5, and an amplifying circuit 40 connected to the output of the filter 30. According to the switching operation of the switch SW5, the output from the first amplifying circuit 200 is selectively applied to the filter 30. The filter 30 is a low pass filter comprising a resistor R7 and a capacitor C7. On the other hand, the amplifying circuit 40 comprises an OP amplifier OP5 connected at its terminal + to the filter 30 via a capacitor C8 for cutting off direct current. To the inverting terminal—of the OP amplifier OP5, a capacitor C9 for removing noise is connected via a resistor R8. A resistor R9 is connected between the inverting terminal—and the output terminal of the OP amplifier OP5. To the output terminal of the OP amplifier OP5, a capacitor C10 is also connected.

All of switches SW1 to SW5 according to the present invention are operatively connected, although not shown in the drawings.

The audio device having the above-mentioned arrangement according to the present invention is operated in its record mode or playback mode. The operation of the device will now be described in conjunction with the respective modes.

1) RECORD MODE

When the audio device should be operated in its record mode, the user operates switches SW1 to SW5 so that their movable terminals are connected to the corresponding fixed terminals R, respectively. As the switch SW3 is switched to its fixed terminal R, an audio signal from the microphone MIC is received in the second amplifying circuit 300 and amplified by the OP amplifier OP6. The amplified audio signal is sent to the third amplifying circuit 400 and amplified again by the OP amplifier OP2. At this time, the horizontal synchronizing component of the output of OP amplifier OP2 is removed by the remover 1. The result signal is amplified again by the OP amplifier OP3 and then outputted to the outer speaker SPK or the earphone EP so that the user can monitor the audio signal received from the microphone MIC.

On the other hand, the audio signal from the remover 1 is also amplified by the OP amplifier OP4 and then applied to the adder 12 of the mixer 10. In the adder 12, the audio signal is mixed with a bias signal of a predetermined frequency oscillated from the oscillator 11 and applied to the adder 12. The output from the adder 12 is sent to the switch SW2. At this time, the switch SW2 is at the state that its movable terminal is connected to its fixed terminal R, thereby enabling the audio signal from the mixer 10 to be recorded on the magnetic tape by the audio head AHD.

The playback head PHD which is spaced away from the audio head AHD as shown in FIG. 3 detects the audio signal which has been recorded on the magnetic tape by the audio head AHD.

The audio signal detected by the playback head PHD is applied the first amplifying circuit 200, since the switch SW4 is at the state that its movable terminal is connected to its fixed terminal R. At this time, the switch SW1 is also at the state that its movable terminal is connected to its fixed terminal R. Accordingly, the audio signal from the audio head AHD does not affect the first amplifying circuit 200. The audio signal from the playback head PHD applied to the first amplifying circuit 200 is amplified by the OP amplifier OP1 and then compensated for low frequency by the capacitor C3 and the resistor R4. At this time, the switch SW4 is at the state that its movable terminal is connected to its fixed terminal R. Accordingly, the output from the first amplifying circuit 100 does not affect the third amplifying circuit 400. Since the switch SW5 is at the state that its movable terminal is connected to its fixed terminal R, the noise of the high frequency component of the audio signal from the first amplifying circuit 200 is removed by the resistor R7 and the capacitor C7. The result signal is amplified by the OP amplifier OP5 and then outputted to an outer terminal O-P. By connecting the speaker or the earphone to the outer terminal O-P, therefore, the user can monitor whether the audio signal from the microphone MIC is correctly recorded by the audio head AHD.

2) PLAYBACK MODE

When the audio device should be operated in its playback mode, so as to play back the audio signal recorded on the magnetic tape and listen to the sound, the user operates switches SW1 to SW3 so that their movable terminals are connected to the corresponding fixed terminals P, respectively. Since the switch SW2 is switched to its fixed terminal P, the output from the mixer 10 is not applied to the audio head AHD so that the audio head AHD detects completely the audio signal from the magnetic tape and applies it to the switch SW1.

Switches SW1 and SW4 are also at the state that their movable terminals are connected to their fixed terminals P. Accordingly, the audio signal from the audio head AHD is amplified by the first amplifying circuit 200. At this time, the first amplifying circuit 200 amplifies completely the audio signal from the audio head AHD, in that the audio signal detected by the playback head PHD can not be applied to the amplifying circuit 20 of the first amplifying circuit 200, due to the switched condition of the switch SW4.

As above, the audio signal from the playback head PHD should not be applied to the first amplifying circuit 200. If the audio signal from the audio head AHD and the audio signal from the playback head PHD are simultaneously applied to the first amplifying circuit 200, they may be mixed with each other, so that a complete sound reproduction may be impossible.

Since switches SW3 and SW5 are also at the state that their movable terminals are connected to their fixed terminals P, the audio signal amplified by the first amplifying circuit 200 is amplified by the OP amplifiers OP2 and OP3 of the third amplifying circuit 400. The amplified audio signal is then outputted to the outer speaker SPK or the earphone EP so that the user can listen to the audio signal detected from the magnetic tape.

At this time, the audio signal from the microphone MIC and the audio signal from the first amplifying circuit 200 are cut off by the switch SW3 and the switch SW5, respectively, so that the user can not listen to those audio signals.

If necessary, the switch SW5 may be switched to its fixed terminal R, even in the playback mode operation of the audio device. In this case, the user can listen to the audio signal by utilizing the outer terminal O-P.

As apparent from the above description, the present invention provides an audio device in which a playback head is positioned near an audio head, so that the user can listen to an audio signal recorded on a magnetic tape in the record mode operation, by utilizing switches and an audio signal outputting circuit. Accordingly, it is possible to monitor whether the audio signal is completely recorded on the magnetic tape.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A circuit for monitoring the recorded state of an audio signal from a microphone on a magnetic tape, comprising:

audio signal record and detect means for recording the audio signal on the magnetic tape and detecting the audio signal recorded thereon;

audio signal detect means for detecting the audio signal recorded on the magnetic tape, said audio signal detect means providing means for monitoring the audio signal recorded on the magnetic tape;

first amplifying means for amplifying selectively the output from said audio signal record and detect means and the output from said audio signal detect means;

second amplifying means for amplifying the audio signal from the microphone;

third amplifying means for amplifying selectively the output from said first amplifying means or the output from the second amplifying means and applying the amplified output to said audio signal record and detect means, a speaker and an earphone; and fourth amplifying means for amplifying selectively the audio signal from the first amplifying means and applying the amplified output to a second speaker or a second earphone.

2. A circuit in accordance with claim 1, wherein said audio signal detect means comprises a head for detecting the audio signal recorded on the magnetic tape, said head electronically connected to the second speaker or second earphone, said second speaker or second earphone providing further means for monitoring the audio signal recorded on the magnetic tape.

3. A circuit in accordance with claim 1, wherein said first amplifying means comprises a first amplifying circuit for amplifying a signal received therein, a first switch connected between said first amplifying circuit and said audio signal record and detect means and adapted to be switched for applying selectively the output from the audio signal record and detect means, and a second switch connected between the first amplifying circuit and the audio detect means and adapted to be switched for applying selectively the output from the audio detect means to the first amplifying circuit.

4. A circuit in accordance with claim 1, wherein said fourth amplifying means comprises a filter for filtering a signal received therein, a second amplifying circuit for amplifying the output from said filter, and a third switch adapted to be switched for applying selectively the output from the first amplifying means to the filter.

5. A circuit in accordance with claim 4, wherein said filter is a low pass filter comprising a resistor and a capacitor.

6. A circuit for monitoring the recorded state of an audio signal from a microphone on a magnetic tape, comprising:

audio signal record and detect means for recording the audio signal on the magnetic tape and detecting the audio signal recorded thereon;

audio signal detect means for detecting the audio signal recorded on the magnetic tape, said audio signal detect means comprising a head, said audio signal detect means providing means for monitoring the audio signal recorded on the magnetic tape;

first amplifying means for amplifying selectively the output from said audio signal record and detect means and the output from said audio signal record and detect means and the output from said audio signal detect means, said first amplifying means comprising a first amplifying circuit for amplifying a signal received therein, a first switch connected between said first amplifying circuit and said audio signal record and detect means and adapted to be switched for applying selectively the output from the audio signal record and detect means, and a second switch connected between the first amplifying circuit and the audio detect means and adapted to be switched for applying selectively the output from the audio detect means to the first amplifying circuit;

second amplifying means for amplifying the audio signal from the microphone;

third amplifying means for amplifying selectively the output from said first amplifying means or the output from the second amplifying means and applying the amplified output to said audio signal record and detect means, a speaker and an earphone, said third amplifying means including a remover filter for filtering a signal received therein; and fourth amplifying means for amplifying selectively the audio signal from the first amplifying means and applying the amplified output to a second speaker or a second earphone, said fourth amplifying means comprising a low pass filter for filtering a signal received therein, a second amplifying circuit for amplifying the output from said filter, and a third switch adapted to be switched for applying selectively the output from the first amplifying means to the filter, said low pass filter comprising a resistor and a capacitor.

* * * * *